United States Patent
Kim et al.

(10) Patent No.: US 11,533,458 B2
(45) Date of Patent: Dec. 20, 2022

(54) IMAGE PROCESSING DEVICE INCLUDING NEURAL NETWORK PROCESSOR AND OPERATING METHOD THEREOF

(71) Applicant: Samsung Electronics Co., Ltd., Suwon-si (KR)

(72) Inventors: Irina Kim, Suwon-si (KR); Seongwook Song, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 188 days.

(21) Appl. No.: 15/930,615

(22) Filed: May 13, 2020

(65) Prior Publication Data

US 2021/0006755 A1    Jan. 7, 2021

(30) Foreign Application Priority Data

Jul. 3, 2019   (KR) .................. 10-2019-0080308

(51) Int. Cl.
*H04N 9/04*     (2006.01)
*H04N 5/232*    (2006.01)
*G06T 3/40*     (2006.01)

(52) U.S. Cl.
CPC ....... *H04N 9/04551* (2018.08); *G06T 3/4015* (2013.01); *G06T 3/4046* (2013.01); *H04N 5/23229* (2013.01); *H04N 5/23245* (2013.01); *H04N 5/232411* (2018.08); *H04N 2209/045* (2013.01)

(58) Field of Classification Search
CPC ............. H04N 9/0451; H04N 9/04515; H04N 9/0455–04561; H04N 5/23229; H04N 5/23241; H04N 5/232411; H04N 5/23245; G06T 3/4015; G06T 3/4046; G06T 5/001; G06T 5/002; G06T 5/005; G06V 10/82
See application file for complete search history.

(56) References Cited

U.S. PATENT DOCUMENTS

| | | | |
|---|---|---|---|
| 7,519,488 B2 | 4/2009 | Fu et al. | |
| 7,747,070 B2 | 6/2010 | Puri | |
| 8,515,131 B2 | 8/2013 | Koch et al. | |
| 8,645,832 B2 | 2/2014 | Pea et al. | |
| 9,565,512 B2 | 2/2017 | Rhoads et al. | |
| 10,764,507 B1 * | 9/2020 | Li | ............. H04N 9/04515 |
| 2013/0073738 A1 | 3/2013 | Reisman | |
| 2014/0253808 A1 * | 9/2014 | Tachi | ............. H04N 9/04515 348/624 |
| 2015/0215590 A1 | 7/2015 | Nowozin et al. | |
| 2016/0004931 A1 | 1/2016 | Andreopoulos et al. | |
| 2016/0239706 A1 | 8/2016 | Dijkman et al. | |
| 2016/0328646 A1 | 11/2016 | Lin et al. | |

(Continued)

*Primary Examiner* — Paul M Berardesca

(74) *Attorney, Agent, or Firm* — Harness, Dickey & Pierce, P.L.C.

(57) ABSTRACT

An image processing device includes: an image sensor configured to generate first image data by using a color filter array; and processing circuitry configured to select a processing mode from a plurality of processing modes for the first image data, the selecting being based on information about the first image data; generate second image data by reconstructing the first image data using a neural network processor based on the processing mode; and generate third image data by post-processing the second image data apart from the neural network processor based on the processing mode.

13 Claims, 16 Drawing Sheets

(56) References Cited

U.S. PATENT DOCUMENTS

| | | |
|---|---|---|
| 2017/0076170 A1 | 3/2017 | Tuzel et al. |
| 2017/0185871 A1 | 6/2017 | Zhang et al. |
| 2017/0257584 A1* | 9/2017 | Fujita .................... G06T 3/4038 |
| 2018/0268526 A1 | 9/2018 | Mentl et al. |
| 2018/0293710 A1 | 10/2018 | Meyer et al. |
| 2019/0231178 A1* | 8/2019 | Kikuchi ............. A61B 1/00186 |
| 2020/0294191 A1* | 9/2020 | Chuang ................ G06T 3/4015 |
| 2021/0217134 A1* | 7/2021 | Okamura ................ H04N 9/07 |

* cited by examiner

IMAGE PROCESSING DEVICE INCLUDING NEURAL NETWORK PROCESSOR AND OPERATING METHOD THEREOF

CROSS-REFERENCE TO RELATED APPLICATION

This application claims the benefit of Korean Patent Application No. 10-2019-0080308, filed on Jul. 3, 2019, in the Korean Intellectual Property Office, the disclosure of which is incorporated herein in its entirety by reference.

BACKGROUND

Some example embodiments of some inventive concepts relate to an image processing device for performing an image processing operation using a neural network processor and an operating method thereof.

An image processor provided to an imaging device such as a camera or a smartphone may perform image processing such as changing a data format of image data provided from an image sensor into a data format of RGB, YUV, or the like, cancelling noise in the image data, or adjusting brightness. Recently, due to greater demand for high image quality photographs, images, and the like, greater overhead may be applied to an image processor, thereby causing problems such as inefficient power consumption in the image processor and quality deterioration of photographs, images, and the like.

SUMMARY

Some example embodiments of some inventive concepts include an image processing device for processing images by complementarily performing a processing operation on image data using a neural network processor and an operating method thereof.

According to some example embodiments of some inventive concepts, there is provided an image processing device including: an image sensor configured to generate first image data by using a color filter array; and processing circuitry configured to select a processing mode from a plurality of processing modes for the first image data, the selecting being based on information about the first image data; generate second image data by reconstructing the first image data using a neural network processor based on the processing mode; and generate third image data by post-processing the second image data apart from the neural network processor based on the processing mode.

According to some other example embodiments of some inventive concepts, there is provided an image processing device including: an image sensor configured to generate first image data by using a color filter array; and processing circuitry configured to select a processing mode from a plurality of processing modes for Nth-part data of the first image data based on information about the Nth-part data, N being an integer of at least one; perform first reconstruction processing for the Nth-part data using the neural network processor and based on the processing mode; perform second reconstruction processing on the Nth-part data apart from the neural network processor based on the processing mode; and generate second image data based on a result of the first reconstruction processing and a result of the second reconstruction processing.

According to some example embodiments of some inventive concepts, there is provided an operating method of an image processing device including a color filter array and a neural network processor, the operating method including: generating first image data by using the color filter array; selecting a processing mode of a plurality of processing modes for the first image data, the selecting based on information about the first image data; generating second image data by reconstructing the first image data using the neural network processor based on the processing mode; and generating third image data by post-processing the second image data apart from the neural network processor based on the processing mode.

BRIEF DESCRIPTION OF THE DRAWINGS

Some example embodiments of some inventive concepts will be more clearly understood from the following detailed description taken in conjunction with the accompanying drawings in which.

DETAILED DESCRIPTION OF THE EMBODIMENTS

Hereinafter, some example embodiments of some inventive concepts will be described in detail with reference to the accompanying drawings.

Figure 1:
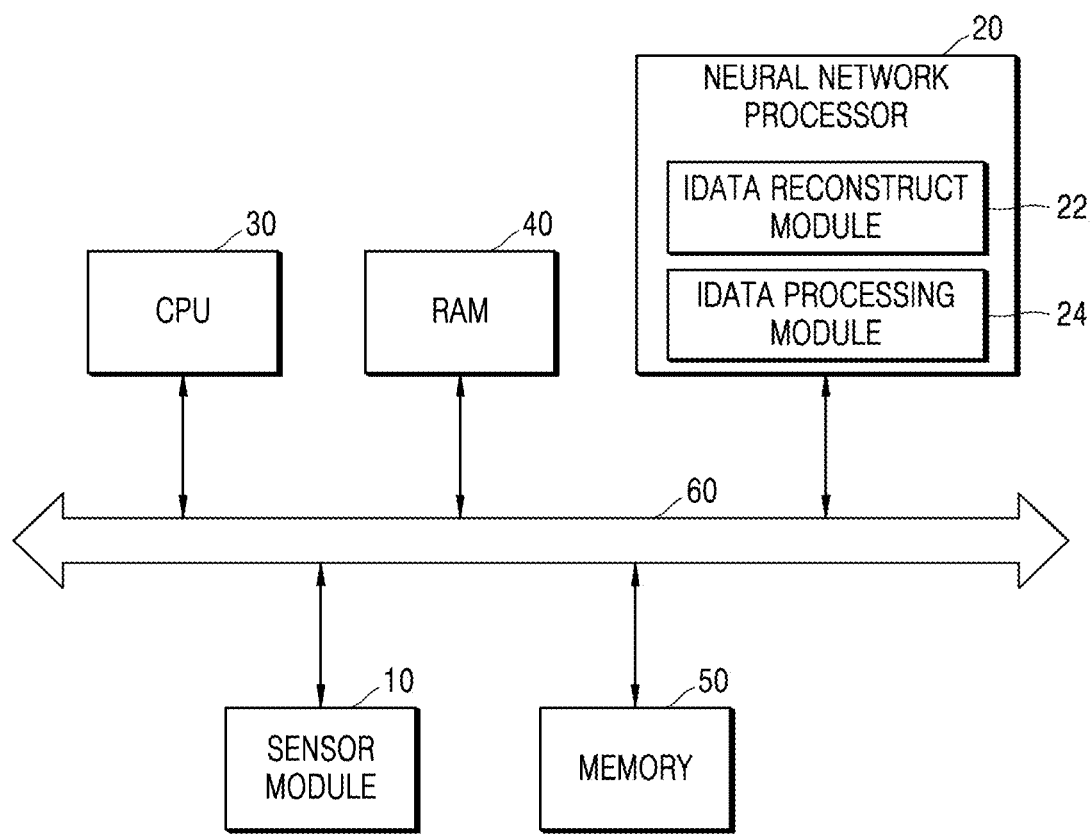
FIG. 1 is a block diagram of a neural network system according to some example embodiments of some inventive concepts.

FIG. 1 is a block diagram of a neural network system 1 according to some example embodiments of some inventive concepts.

The neural network system 1 may be configured to train a neural network (or allow the neural network to learn), and/or to infer information included in input data by using the neural network to analyze the input data. The neural network system 1 may be configured to determine a context or control components in an electronic device in which the neural network system 1 is mounted, based on the inferred information. For example, the neural network system 1 may be applied to a smartphone, a tablet device, a smart TV, an augmented reality (AR) device, an Internet of Things (IoT) device, an autonomous vehicle, robotics, medical equipment, a drone, an advanced drivers assistance system (ADAS), an image display device, a measurement instrument, and the like for performing voice recognition, image recognition, image classification, image processing, and the like using a neural network, and/or may be mounted on one of various types of electronic devices. According to some example embodiments of some inventive concepts, the neural network system 1 of FIG. 1 may be an application processor.

Referring to FIG. 1, the neural network system 1 may include a sensor module 10, a neural network processor (or a neural network device) 20, processing circuitry such as a central processing unit (CPU) 30, random access memory (RAM) 40, and a memory 50. The neural network system 1 may further include an input/output module, a security module, a power control device, and the like and/or may further include various types of processing circuitry.

According to some example embodiments of some inventive concepts, some or all of components in the neural network system 1 may be formed in a single semiconductor chip. For example, the neural network system 1 may be implemented as a system on chip (SoC). The components in the neural network system 1 may communicate with each other via a bus 60.

Some example embodiments include processing circuitry, such as a CPU 30, a pre-processor, a processor, a main processor, a post-processor, an application processor, an image signal processors, etc., including combinations thereof, where the processing circuitry is configured to control a general operation of the neural network system 1. In some example embodiments, the processing circuitry may include hardware such as logic circuits; a hardware/software combination, such as a processor executing software; or a combination thereof. For example, a processor may include, but is not limited to, a central processing unit (CPU), a graphics processing unit (GPU), a tensor processing unit (TPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry, such as a CPU 30, may include a single processor core (a single-core CPU) or a plurality of processor cores (a multi-core CPU). The processing circuitry, such as a CPU 30, may be configured to process and/or execute programs and/or data stored in a storage area such as the memory 50, by using the RAM 40. For example, the processing circuitry, such as a CPU 30, may be configured to execute an application program and/or to control the neural network processor 20 so as to perform neural network-based tasks required according to the execution of the application program. In some example embodiments, the processing circuitry may be arranged as a single unit; in some other example embodiments, the processing circuitry may include a plurality of units, which may be homogenous (e.g., two or more processing units of a same or similar type), heterogeneous (e.g., two or more processing units of different types), or a combination thereof. In some example embodiments, processing units of the processing circuitry may operate independently, in series and/or in parallel, in a distributed manner, and/or in synchrony. In some example embodiments, processing units of the processing circuitry may have individualized functionality; in other example embodiments, processing units of the processing circuitry may share functionality.

In some example embodiments, the neural network may include at least one of various types of neural network models including a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, and the like.

The neural network processor 20 may be configured to perform a neural network operation based on received input data. In addition, the neural network processor 20 may be configured to generate an information signal based on a performing result of the neural network operation. In some example embodiments, the neural network processor 20 may include hardware such as logic circuits; a hardware/software combination, such as a processor executing software; or a combination thereof. For example, the neural network processor 20 may include, but is not limited to, a central processing unit (CPU), a graphics processing unit (GPU), an arithmetic logic unit (ALU), a microcomputer, a field programmable gate array (FPGA), a System-on-Chip (SoC), a programmable logic unit, a microprocessor, a neural network operation accelerator such as a tensor processing unit (TPU), a coprocessor, a digital signal processor (DSP), an application specific integrated circuit (ASIC), or the like. In some example embodiments, the neural network processor 20 may be included in the processing circuitry; in some other example embodiments, the neural network processor 20 may be distinct from the processing circuitry. In some example embodiments, the neural network processor 20 may include processing units, such as (for example) an image data reconstructor 22 and/or an image data processor 24.

The configuration of an image processing device as disclosed herein, such as shown in FIG. 1, may provide one or several technical advantages. For example, the image processing device may be configured to utilize a neural network processor 20 for some image processing modes, such as using a despeckling and/or denoising convolutional neural network to reduce specks and/or noise in an image. Using the neural network processor 20 for such operations, instead of processing circuitry such as a main processor, may enable the main processor to perform other computation in a faster and/or more efficient manner. Additionally, the image processing device may be able to perform processing of the image more quickly by distributing the processing (for example, in parallel) using both the neural network processor 20 and other processing circuitry, which may enable the image processing device to provide the completely processed image faster, and/or to process more images in a selected time frame, such as a faster framerate of a sequence of images in a video. As another example, the image processing device may selectively utilize the neural network processor 20 for images for which the operation of the neural network processor is applicable, such as applying a denoising neural network operation to a noisy image, while refraining from utilizing the neural network processor 20 for images for which the operation of the neural network processor is not necessarily applicable, such as refraining from applying a denoising neural network operation to a relatively noise-free image. Such selectivity may conserve the application of the neural network processor 20, such that processing of the images to which the processing of the neural network processor 20 is not necessarily applicable may be completed faster. As another example, the selective utilization of the neural network processor 20 may enable the image processing device to deactivate the neural network processor 20 when not in use, for example, to conserve power consumption of a battery and therefore extend the longevity or runtime of the battery, and/or to reduce heat production.

The sensor module 10 may be configured to collect information about the surroundings of an electronic device in which the neural network system 1 is mounted. The sensor module 10 may be configured to sense or receive a signal (e.g., an image signal, a voice signal, a magnetic signal, a biometric signal, a touch signal, or the like) from the outside of the electronic device and/or to convert the sensed or received signal into sensing data. To this end, the sensor module 10 may include at least one of various types of sensing devices including, for example, a microphone, an imaging device, an image sensor, a light detection and ranging (LIDAR) sensor, an ultrasonic sensor, an infrared sensor, a biosensor, a touch sensor, and the like.

The sensing data may be provided to the neural network processor 20 as input data or stored in the memory 50. The sensing data stored in the memory 50 may be provided to the neural network processor 20. According to some example embodiments of some inventive concepts, the neural network processor 20 may further include a graphics processing unit (GPU) configured to process image data, and the image data may be processed by the GPU and then provided to the memory 50, the processing circuitry, and/or the neural network processor 20.

For example, the sensor module 10 may include an image sensor and may be configured to generate image data by photographing an external environment of an electronic device. The image data output from the sensor module 10 may be directly provided to the neural network processor 20, or may be stored in the memory 50 and then provided to the neural network processor 20.

According to some example embodiments of some inventive concepts, the neural network processor 20 may be configured to receive image data from the sensor module 10 and/or the memory 50 and/or to perform a neural network operation based on the received image data. The neural network processor 20 may include an image data reconstruct module 22 and/or an image data processing module 24, which may be defined through a certain neural network model-based neural network operation. A configuration of the modules to be described below may be a software block executed by a certain processor or may be implemented as a combination of a dedicated hardware block and a processing unit.

The image data reconstruct module 22 may be configured to reconstruct image data. An image data reconstruct operation may indicate an operation of converting a format of image data, e.g., an operation of converting image data of a tetra format to be described below into image data of a Bayer format or an RGB format (or a YUV format or the like). According to some example embodiments of some inventive concepts, the image data reconstruct module 22 may be configured to perform a reconstruction operation complementary to a reconstruction operation, performed by the processing circuitry such as a CPU 30, on image data or solely perform a reconstruction operation instead of the processing circuitry such as a CPU 30.

The image data processing module 24 may be configured to perform a pre-processing and/or post-processing operation on image data other than the reconstruction on the image data. According to some example embodiments of some inventive concepts, the image data processing module 24 may be configured to perform a pre-processing and/or post-processing operation that are complementary to a pre-processing and/or post-processing operation, performed by the processing circuitry such as a CPU 30, on image data or solely perform a pre-processing or post-processing operation instead of the processing circuitry such as a CPU 30. The neural network processor 20 may be configured to perform the operations described above, by using the RAM 40 and/or the memory 50.

According to some example embodiments of some inventive concepts, the neural network processor 20 may be configured to selectively perform a reconstruction operation and/or a processing operation on image data based on a state of the image data, and a detailed description thereof will be made below.

The memory 50 may include at least one of a volatile memory and a nonvolatile memory. The nonvolatile memory includes read-only memory (ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), ferroelectric RAM (FeRAM), and the like. The volatile memory may include dynamic RAM (DRAM), static RAM (SRAM), synchronous DRAM (SDRAM), PRAM, MRAM, RRAM, FeRAM, and the like. According to some example embodiments of some inventive concepts, the memory 50 may include at least one of a hard disk drive (HDD), a solid-state drive (SSD), a compact flash (CF) card, a secure digital (SD) card, a micro secure digital (Micro-SD) card, a mini secure digital (Mini-SD) card, an extreme digital (XD) card, and a memory stick.

Figure 2:
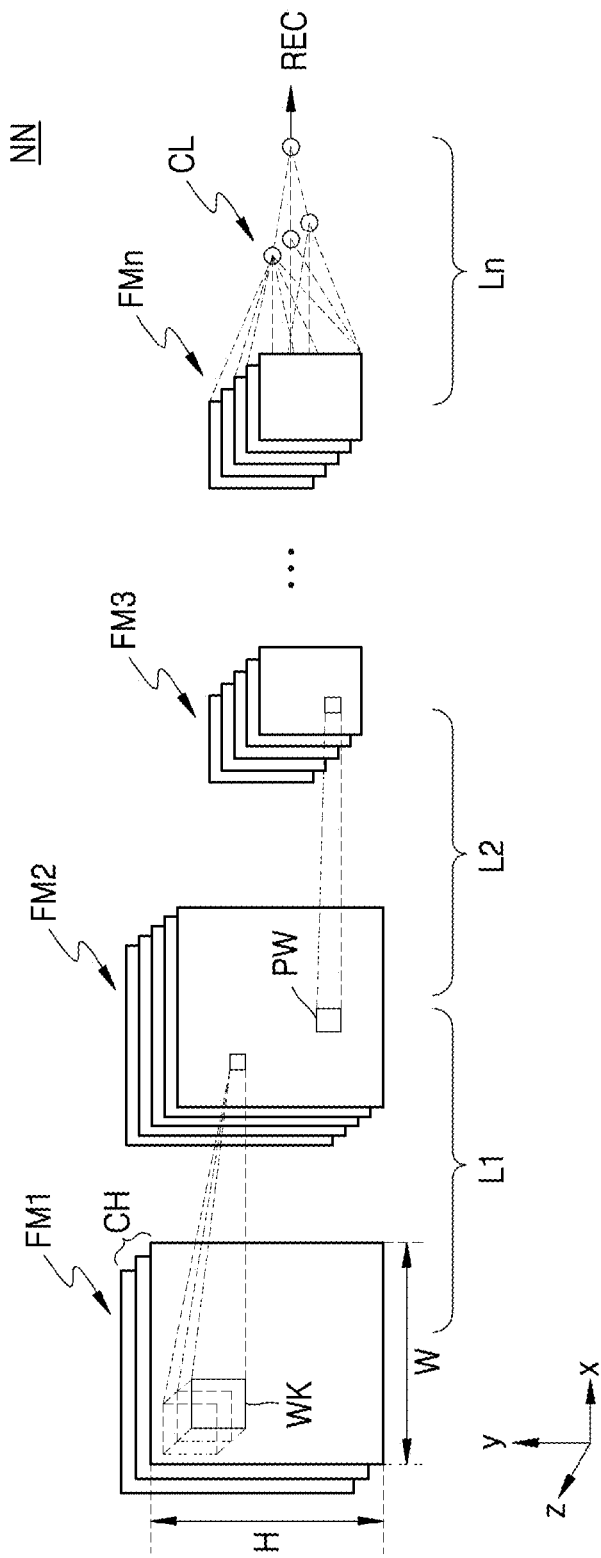
FIG. 2 is an example of a neural network structure.

FIG. 2 is an example of a neural network structure. Referring to FIG. 2, a neural network NN may include a plurality of layers, e.g., first to nth layers, L1 to Ln. Such a neural network of a multi-layer structure may be referred to as a DNN or a deep learning architecture. Each of the plurality of layers L1 to Ln may be a linear layer or a nonlinear layer, and according to some example embodiments of some inventive concepts, at least one linear layer, and at least one nonlinear layer may be combined and referred to as one layer. For example, a linear layer may include a convolution layer and a fully connected layer, and a nonlinear layer may include a pooling layer and an activation layer.

For example, the first layer L1 may be a convolution layer, the second layer L2 may be a pooling layer, and the nth layer Ln may be a fully connected layer as an output layer. The neural network NN may further include an activation layer and may further include a layer configured to perform another type of arithmetic operation.

Each of the plurality of layers L1 to Ln may receive, as an input feature map, an input image frame or a feature map generated in a previous layer and perform an arithmetic operation on the input feature map, thereby generating an output feature map or a recognition signal REC. In this case, a feature map indicates data representing various features of input data. First to nth feature maps FM1, FM2, FM3, and FMn may have, for example, a two-dimensional (2D) matrix or 3D matrix (or tensor) format including a plurality of feature values. The first to nth feature maps FM1, FM2, FM3, and FMn may have width (or column) W, height (or row) H, and depth D, respectively, corresponding to an x-axis, a y-axis, and a z-axis on a coordinate system. Herein, the depth D may be referred to as the number of channels.

The first layer L1 may generate the second feature map FM2 by convoluting the first feature map FM1 with a weightmap WK. The weightmap WK may have a 2D matrix or 3D matrix format including a plurality of weight values. The weightmap WK may be referred to as a kernel. The weightmap WK may filter the first feature map FM1 and may be referred to as a filter or a kernel. A depth (e.g., a number of channels) of the weightmap WK may be the same as a depth (e.g., a number of channels) of the first feature map FM1, and/or the same channels of the weightmap WK and the first feature map FM1 may be convolved. The weightmap WK may be shifted in a manner of traversing by using the first feature map FM1 as a sliding window. During each shift, each of the weights included in the weightmap WK may be multiplied by and added to all feature values in a region overlapped with the first feature map FM1. According to the convolution of the first feature map FM1 and the weightmap WK, one channel of the second feature map FM2 may be generated. Although FIG. 2 shows one weightmap WK, a plurality of weightmaps may be convoluted with the first feature map FM1 to generate a plurality of channels of the second feature map FM2. In other words, the number of channels of the second feature map FM2 may correspond to the number of weightmaps.

The second layer L2 may generate the third feature map FM3 by changing a spatial size of the second feature map FM2 through pooling. The pooling may be referred to as sampling or down-sampling. A 2D pooling window PW may be shifted on the second feature map FM2 in a unit of a size of the pooling window PW, and a maximum value of feature values (or a mean value of the feature values) in a region overlapped with the pooling window PW may be selected. Accordingly, the third feature map FM3 having a changed spatial size from the second feature map FM2 may be generated. In some example embodiments, a number of channels of the third feature map FM3 may be the same as a number of channels of the second feature map FM2.

The nth layer Ln may classify classes CL of the input data by combining features of the nth feature map FMn. In addition, the nth layer Ln may generate a recognition signal SEC corresponding to a class.

Figure 3:
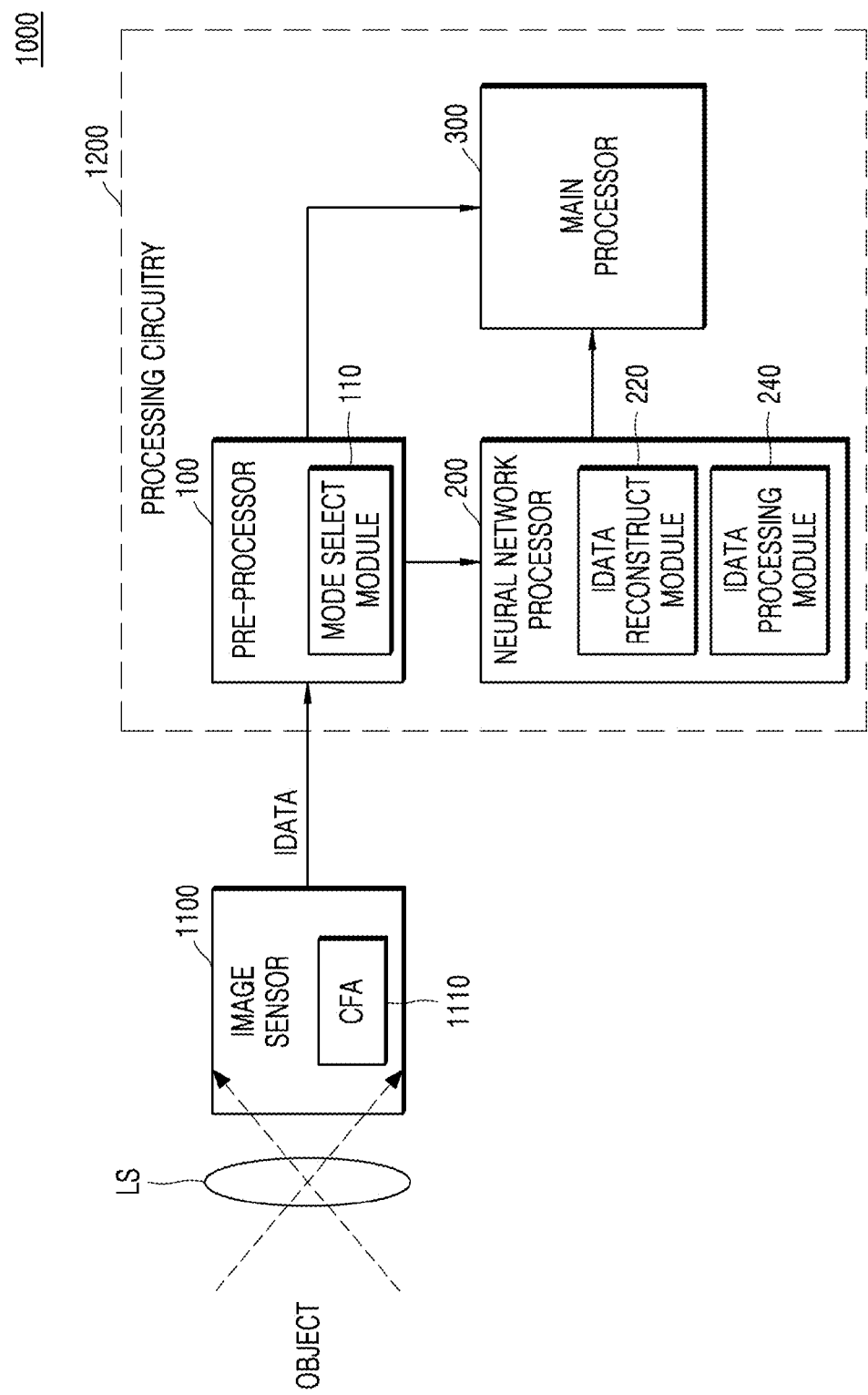
FIG. 3 is a block diagram of an image processing device according to some example embodiments of some inventive concepts.

FIG. 3 is a block diagram of an image processing device 1000 according to some example embodiments of some inventive concepts.

The image processing device 1000 may be implemented as an electronic device for capturing an image and displaying the captured image or performing an operation based on the captured image. The image processing device 1000 may be implemented as, for example, a personal computer (PC), an IoT device, and/or a portable electronic device. The portable electronic device may include a laptop computer, a mobile phone, a smartphone, a tablet PC, a personal digital assistant (PDA), an enterprise digital assistant (EDA), a digital still camera, a digital video camera, audio equipment, a portable multimedia player (PMP), a personal navigation device (PND), an MP3 player, a handheld game console, an e-book, a wearable device, or the like. In some example embodiments, the image processing device 1000 may be mounted on an electronic device such as a drone or an ADAS, and/or an electronic device provided as a part in a vehicle, furniture, a manufacturing facility, a door, various types of measurement instruments, and the like.

Referring to FIG. 3, the image processing device 1000 may include an image sensor 1100 and processing circuitry 1200. The image processing device 1000 may further include other components including a display, a user interface, and the like. The processing circuitry 1200 may include a pre-processor 100, a neural network processor 200, and/or a main processor 300. The pre-processor 100, the neural network processor 200, and the main processor 300 may be implemented by one or more semiconductor chips. In addition, although FIG. 3 separately shows the pre-processor 100 and the main processor 300, this is only an example embodiment, and the pre-processor 100 and the main processor 300 may be implemented as one component.

In some example embodiments, the image sensor 1100 may include a color filter array 1110 having a certain pattern, convert an optical signal of an object, which is incident through an optical lens LS, into an electrical signal by using the color filter array 1110, and generate and output first image data IDATA based on the electrical signal. According to some example embodiments of some inventive concepts, the color filter array 1110 may be implemented to support a next generation pixel technique such as a tetra pattern instead of a Bayer pattern. Hereinafter, for convenience of description, it is assumed that the color filter array 1110 corresponds to a tetra pattern, but it could be sufficiently understood that some example embodiments of some inventive concepts is not limited thereto.

The image sensor 1100 may include, for example, a pixel array including a plurality of pixels two-dimensionally arranged and a read-out circuit, and the pixel array may convert received optical signals into electrical signals. The pixel array may be implemented by photoelectric conversion elements, e.g., charge coupled devices (CCDs), complementary metal oxide semiconductors (CMOSs), or the like and implemented by other various types of photoelectric conversion elements. The read-out circuit may be configured to generate raw data based on an electrical signal provided from the pixel array and/or output, as the first image data IDATA, the raw data, and/or preprocessed data on which bad pixel removal and the like has performed. The image sensor 1100 may be implemented as a semiconductor chip or package including the pixel array and the read-out circuit.

According to some example embodiments of some inventive concepts, the pre-processor 100 may be configured to perform at least one of pre-processing operations such as a cross-talk (X-talk) correction operation, a despeckle operation, and the like on the first image data IDATA. In addition, the pre-processor 100 may include a mode select module 110, and the mode select module 110 may be configured to select any one of a plurality of processing modes as the processing mode for the first image data IDATA based on information about the first image data IDATA. The plurality of processing modes may include a first processing mode and a second processing mode, and hereinafter, the first processing mode may be defined as a processing mode that is selected for performing a processing operation using the neural network processor 200, and the second processing mode may be defined as another processing mode that is selected for performing another processing operation apart from the neural network processor (for example, not by using the neural network processor 200, but by using other processing circuitry, such as the main processor 300).

The information about the first image data IDATA may include at least one of quality information of the first image data IDATA and noise information of the first image data IDATA. According to some example embodiments of some inventive concepts, quality information of the first image data IDATA may indicate an artifact degree of the first image data IDATA, and/or noise information of the first image data IDATA may indicate a noise level of the first image data IDATA. In this case, the mode select module 110 may be configured to select the processing mode (such as the first processing mode) based on determining that use of the neural network processor 200 is desired, preferred, advantageous, and/or necessary, wherein the determining is based on the artifact degree and/or the noise level being greater than a threshold. Otherwise, the mode select module 110 may be configured to select another processing mode (such as the second processing mode) based on the artifact degree and/or the noise level being less than the threshold. The mode select module 110 is only included in some example embodiments, and thus some example embodiments of some inventive concepts are not limited thereto. For example, in some other example embodiments, a processing mode may be selected according to various scenarios based on various pieces of information about the first image data IDATA.

According to some example embodiments of some inventive concepts, the processing circuitry (such as a neural network processor 200) may include an image data reconstruct module 220 and an image data processing module 240. The image data reconstruct module 220 may be configured to perform a reconstruction operation on the first image data IDATA using a neural network processor based on the processing mode.

According to some example embodiments of some inventive concepts, the color filter array may have a certain pattern such as a first pattern, and the image data reconstruct module 220 may be configured to generate second image data corresponding to a second pattern (e.g., a Bayer pattern) other than a tetra pattern by performing a remosaic operation on the first image data IDATA. The first image data IDATA may be referred to as tetra data, and the second image data may be referred to as Bayer data. In this case, the processing circuitry (such as a main processor 300) may be configured to receive the second image data (for example, from the neural network processor 200) and/or to generate full-color image data, for example, by performing a demosaic operation on the second image data.

According to some example embodiments of some inventive concepts, the image data reconstruct module 220 may be configured to generate second image data corresponding to a pattern (e.g., an RGB pattern) other than a tetra pattern by performing a demosaic operation on the first image data IDATA. The first image data IDATA may be referred to as tetra data, and the second image data may be referred to as full-color image data. In this case, the main processor 300 may be configured to receive, from the neural network processor 200, the second image data corresponding to full-color image data and/or to perform post-processing on the second image data for quality improvement, such as noise cancellation, brightness change, and definition adjustment.

According to some example embodiments of some inventive concepts, the image data processing module 240 may be configured to perform some or all of the pre-processing operations instead of the pre-processor 100. In addition, the image data processing module 240 may be configured to perform some or all of the post-processing operations of the main processor 300 for image data of which a format has been converted through reconstruction, instead. According to some example embodiments of some inventive concepts, a number of pre-processing operation types and/or post-processing operation types which the image data processing module 240 may be configured to perform may vary, for example, depending on an imaging condition of the image sensor 1100 and the like. The image processing device 1000 may be configured to acquire the imaging condition of the image sensor 1100 through the first image data IDATA and/or to receive the imaging condition of the image sensor 1100 directly from image sensor 1100 in the form of data.

According to the image processing device 1000 according to some example embodiments of some inventive concepts, the neural network processor 200 may be configured to perform processing operations on image data instead of the pre-processors 100 and/or the main processor 300 according to quality or noise of the image data, thereby reducing loads of the pre-processors 100 and/or the main processor 300, and/or quality of an image output from the image processing device 1000 may be improved through a complementary processing operation of the neural network processor 200.

Figure 4A:
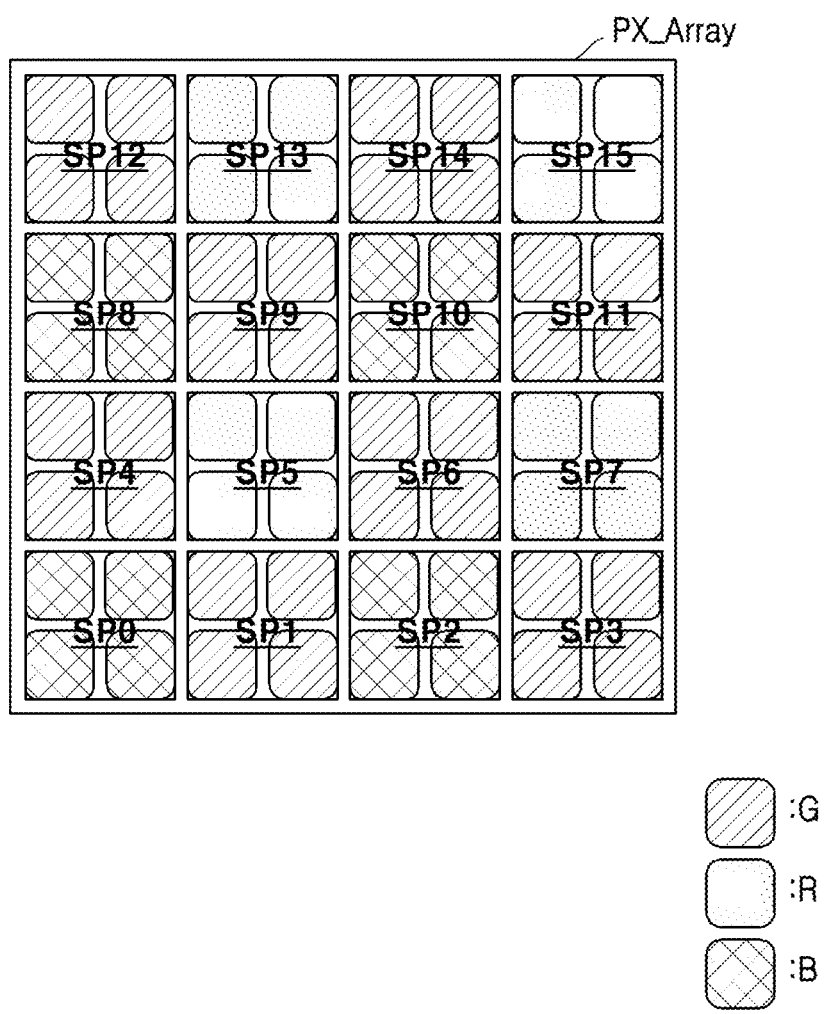
FIGS. 4A to 4C show implementation examples of a pixel array corresponding to the color filter array of FIG. 3.
Figure 4B:
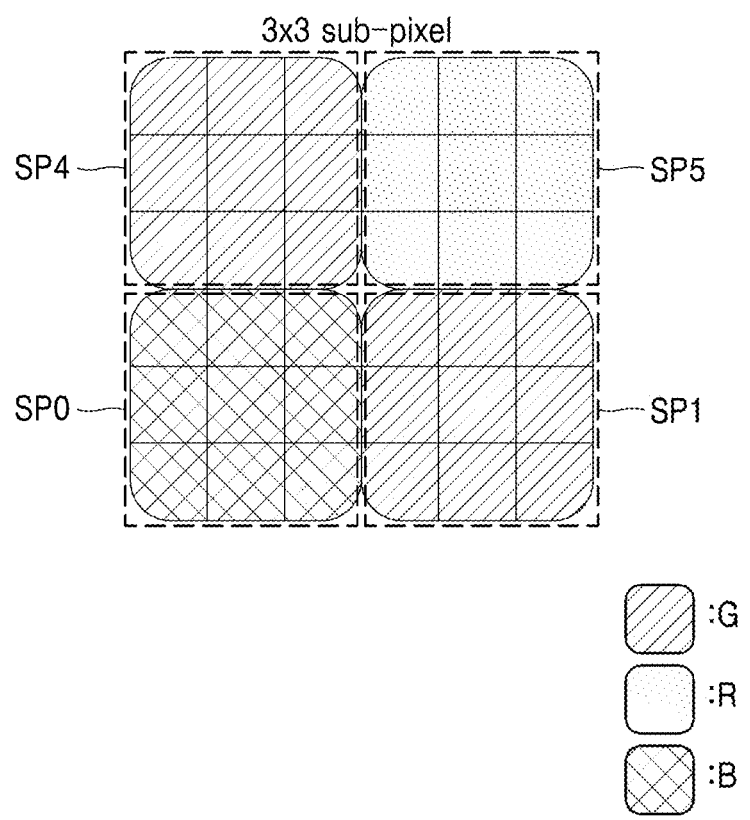
Figure 4C:
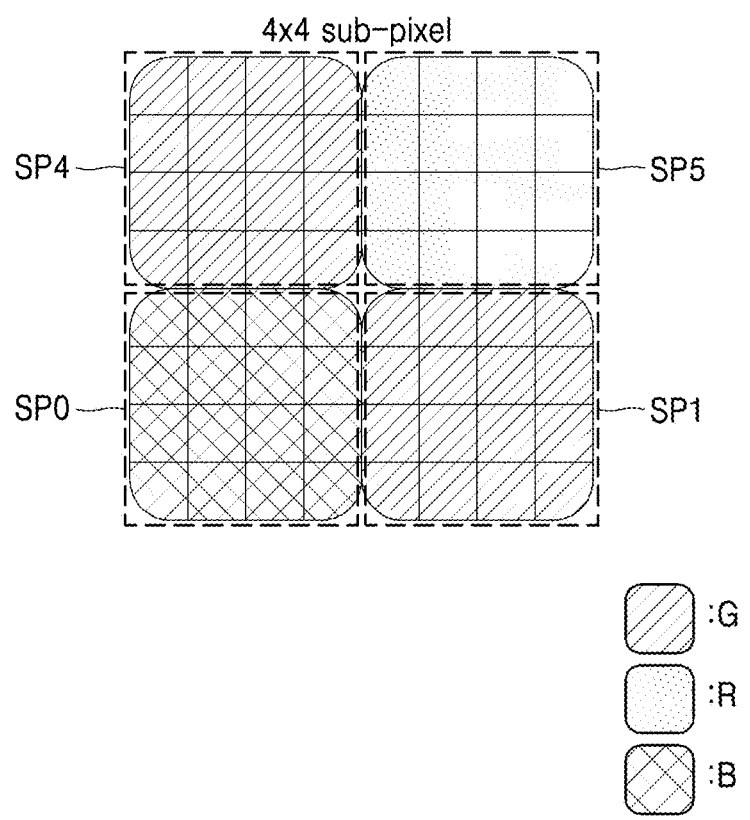

FIGS. 4A to 4C show implementation examples of a pixel array corresponding to the color filter array 1110 of FIG. 3.

Referring to FIG. 4A, a pixel array PX_Array may include a plurality of pixels arranged along a plurality of rows and columns, and for example, each shared pixel defined by a unit including pixels arranged in two rows and two columns may include four sub-pixels. In other words, a shared pixel may include four photodiodes respectively corresponding to four sub-pixels. The pixel array PX_Array may include first to $16^{th}$ shared pixels SP0 to SP15. The pixel array PX_Array may include a color filter such that the first to $16^{th}$ shared pixels SP0 to SP15 sense various colors. For example, the color filter may include filters sensing red (R), green (G), and blue (B), and one of the first to $16^{th}$ shared pixels SP0 to SP15 may include sub-pixels having same color filters arranged thereon. For example, the first shared pixel SP0, the third shared pixel SP2, the ninth shared pixel SP8, and the $11^{th}$ shared pixel SP10 may include sub-pixels having the B color filter, the second shared pixel SP1, the fourth shared pixel SP3, the fifth shared pixel SP4, the seventh shared pixel SP6, the tenth shared pixel SP9, the $12^{th}$ shared pixel SP11, the $13^{th}$ shared pixel SP12, and the $15^{th}$ shared pixel SP14 may include sub-pixels having the G color filter, and the sixth shared pixel SP5, the eighth shared pixel SP7, the $14^{th}$ shared pixel SP13, and the $16^{th}$ shared pixel SP15 may include sub-pixels having the R color filter. In addition, a group including the first shared pixel SP0, the second shared pixel SP1, the fifth shared pixel SP4, and the sixth shared pixel SP5, a group including the third shared pixel SP2, the fourth shared pixel SP3, the seventh shared pixel SP6, and the eighth shared pixel SP7, a group including the ninth shared pixel SP8, the tenth shared pixel SP9, the $13^{th}$ shared pixel SP12, and the $14^{th}$ shared pixel SP13, and a group including the $11^{th}$ shared pixel SP10, the $12^{th}$ shared pixel SP11, the $15^{th}$ shared pixel SP14, and the $16^{th}$ shared pixel SP15 may be arranged in the pixel array PX_Array such that each group corresponds to a Bayer pattern.

However, this arrangement is merely one example embodiment, and the pixel array PX_Array according to some example embodiments of some inventive concepts may include various types of color filters. For example, the color filter may include filters for sensing yellow, cyan, magenta, and green colors. Alternatively, the color filter may include filters for sensing red, green, blue, and white colors. In addition, the pixel array PX_Array may include a greater number of shared pixels, and the arrangement of the first to $16^{th}$ shared pixels SP0 to SP15 may be variously implemented.

Referring to FIG. 4B, each of the first shared pixel SP0, the second shared pixel SP1, the fifth shared pixel SP4, and the sixth shared pixel SP5 may include nine sub-pixels. The first shared pixel SP0 may include nine sub-pixels having the B color filter, and each of the second shared pixel SP1 and the fifth shared pixel SP4 may include nine sub-pixels having the G color filter. The sixth shared pixel SP5 may include nine sub-pixels having the R color filter.

As another example, referring to FIG. 4C, each of first shared pixel SP0, the second shared pixel SP1, the fifth shared pixel SP4, and the sixth shared pixel SP5 may include 16 sub-pixels. The first shared pixel SP0 may include 16 sub-pixels having the B color filter, and each of the second shared pixel SP1 and the fifth shared pixel SP4 may include 16 sub-pixels having the G color filter. The sixth shared pixel SP5 may include 16 sub-pixels having the R color filter.

Figure 5:
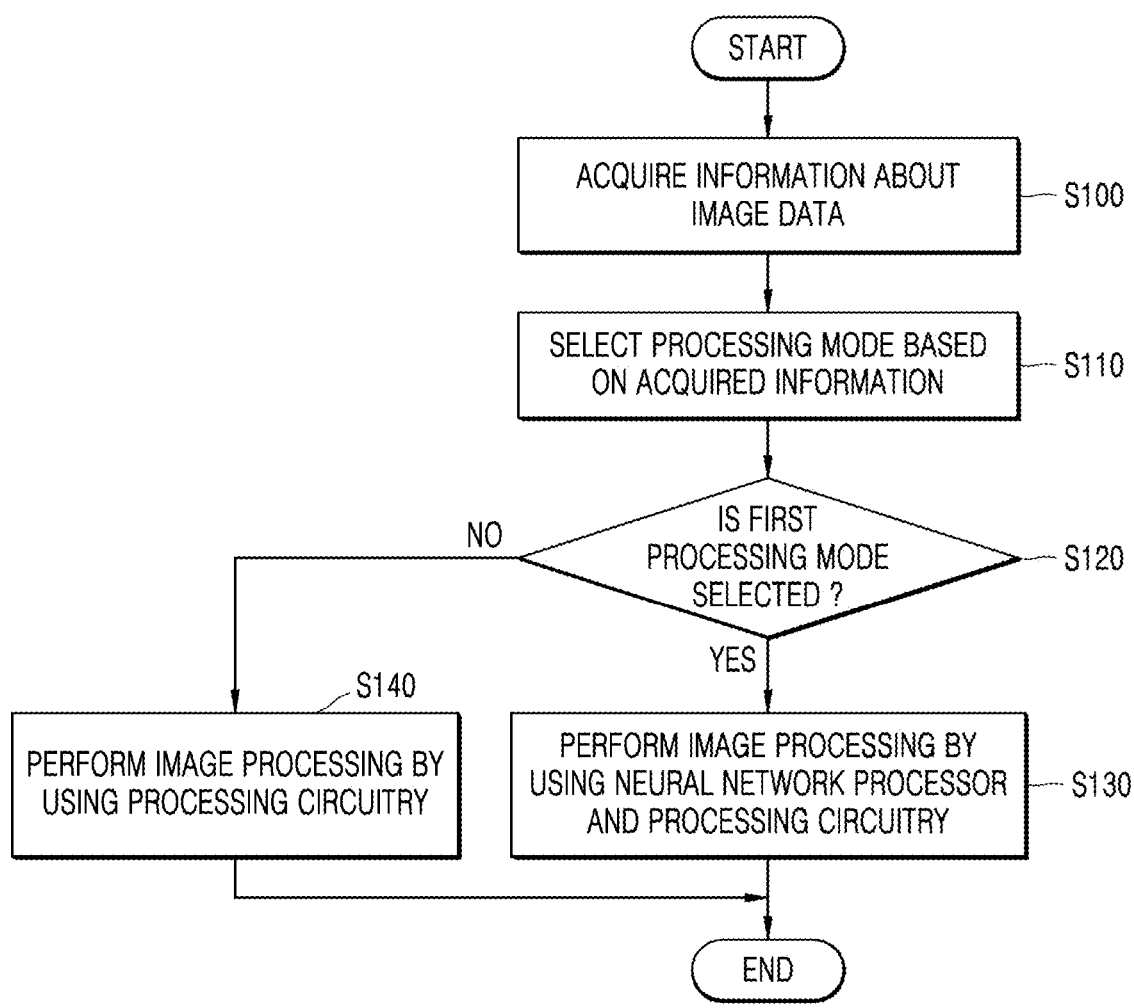
FIG. 5 is a flowchart of an operating method of an image processing device, according to some example embodiments of some inventive concepts.

FIG. 5 is a flowchart of an operating method of an image processing device, according to some example embodiments of some inventive concepts.

Referring to FIG. 5, in operation S100, the image processing device according to some example embodiments of some inventive concepts may include image data from an image sensor and acquire information about the image data before performing a processing operation on the image data. In operation S110, the image processing device may be configured to select a processing mode (such as a first processing mode) from a plurality of processing modes for the image data, wherein the selecting is based on the acquired information. Based on selecting the processing mode (Yes in operation S120), the image processing device may be configured to perform image processing on the image data by using a neural network processor and processing circuitry (such as a main processor) included in the image processing device, in operation S130. Otherwise, another processing mode (such as the second processing mode) may be selected from the plurality of processing modes (No in operation S120), the image processing device may be configured to perform image processing on the image data apart from the neural network processor, for example, by using other processing circuitry (such as a main processor) in operation S140.

FIGS. 6 to 9 are block diagrams for particularly describing operations of processing circuitry (such as neural network processors 200a, 200b, 200c, and 200d) based on the processing mode, according to some example embodiments of some inventive concepts. Hereinafter, the configurations of the modules shown in FIGS. 6 to 9 are merely example embodiments, and thus some inventive concepts of some example embodiments may not be limited thereto. For example, in some example embodiments, a configuration of modules that includes a greater number of pre-processing operations or post-processing operations may be further included in the processing circuitry 1200 of an image processing device 1000 (such as image processing systems 1200a, 1200b, 1200c, and/or 1200d).

Figure 6:
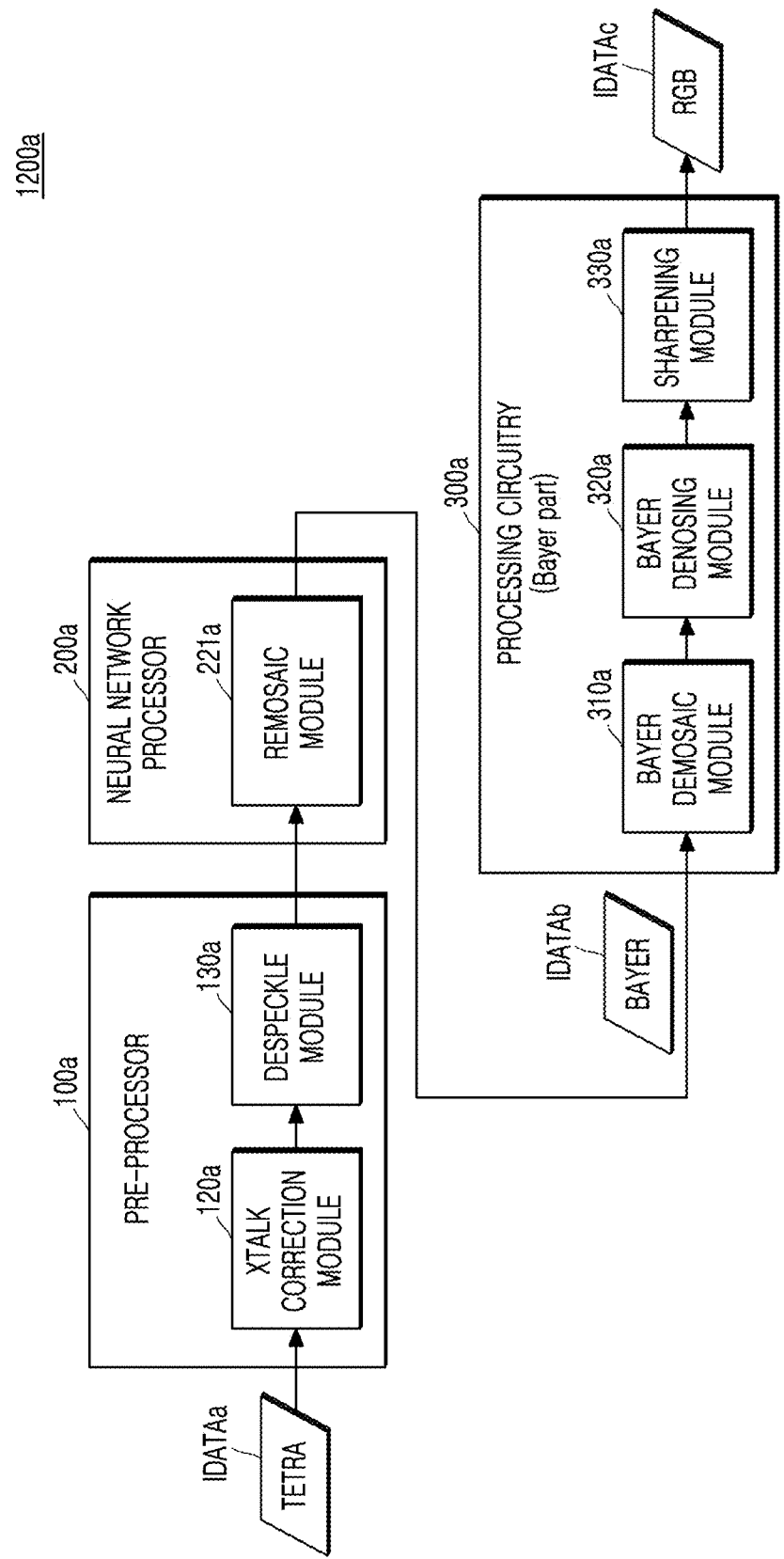
FIGS. 6 to 9 are block diagrams for particularly describing operations of neural network processors in a processing mode, according to some example embodiments of some inventive concept.

Referring to FIG. 6, the image processing system 1200a may include a neural network processor 200a and processing circuitry such as a pre-processor 100a and a main processor 300a. The pre-processor 100a may include an X-talk correction module 120a and a despeckle module 130a, the neural network processor 200a may include a remosaic module 221a, and the main processor 300a may include a Bayer demosaic module 310a, a Bayer denoising module 320a, and a sharpening module 330a.

The pre-processor 100a may be configured to receive tetra data IDATAa and/or to perform pre-processing including an X-talk correction and/or despeckle operation on the tetra data IDATAa. The neural network processor 200a may be configured to receive the preprocessed tetra data IDATAa and/or to generate Bayer data IDATAb by performing a reconstruction operation including a remosaic operation on the tetra data IDATAa. The main processor 300a may be configured to receive the Bayer data IDATAb and/or to generate RGB data IDATAc by performing post-processing including a Bayer demosaic operation, a Bayer denoising operation, and/or a sharpening operation on the Bayer data IDATAb.

Figure 7:
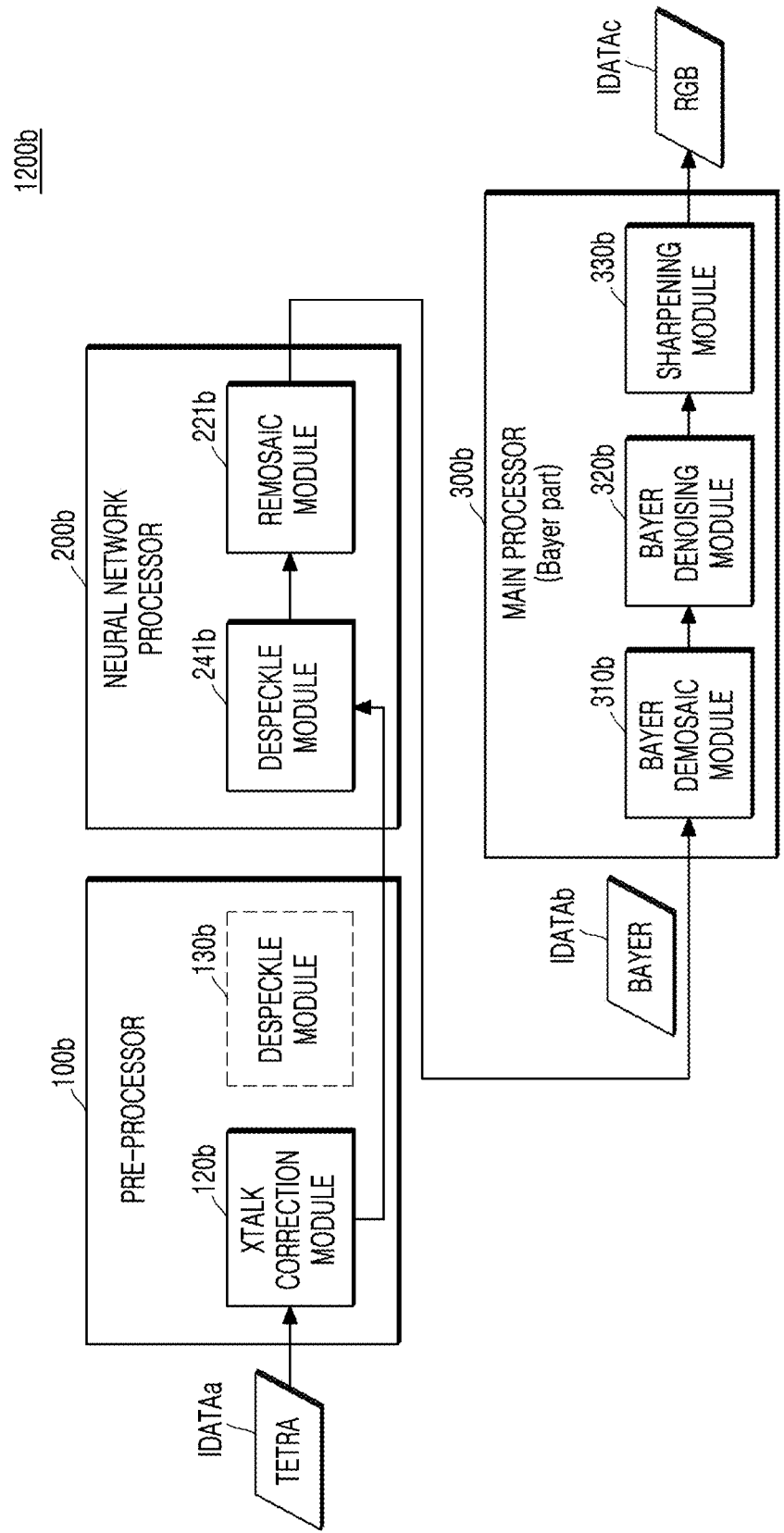

Referring to FIG. 7, the image processing system 1200b may include a neural network processor 200b and processing circuitry such as a pre-processor 100b and a main processor 300b. The pre-processor 100b may include an X-talk correction module 120b, the neural network processor 200b may include a despeckle module 241b and a remosaic module 221b, and the main processor 300b may include a Bayer demosaic module 310b, a Bayer denoising module 320b, and a sharpening module 330b. Compared with FIG. 6, the neural network processor 200b may be further configured to perform a despeckle operation on the tetra data IDATAa instead of the pre-processor 100b. However, this is merely an example embodiment, and thus some example embodiments of some inventive concepts is not limited thereto. For example, in some other example embodiments, the neural network processor 200b may be configured to perform other operations instead of the pre-processor 100b.

Figure 8:
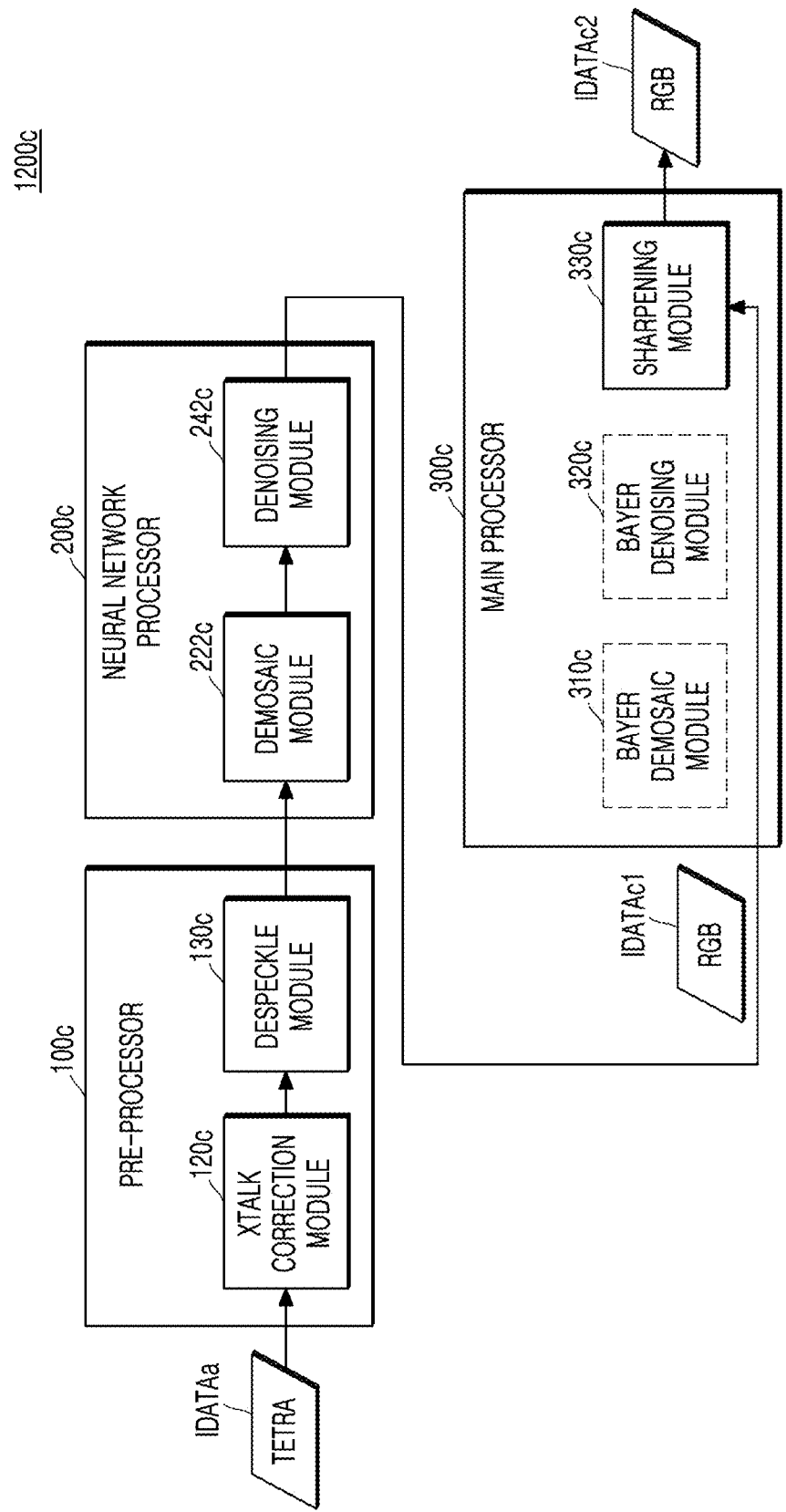

Referring to FIG. 8, the image processing system 1200c may include a pre-processor 100c, a neural network processor 200c, and a main processor 300c. The pre-processor 100c may include an X-talk correction module 120c and a despeckle module 130b, the neural network processor 200c may include a demosaic module 222c and a denoising module 242c, and the main processor 300c may include a sharpening module 330c. Compared with FIG. 6, the neural network processor 200c may be configured to generate RGB data IDATAc1 by performing a demosaic operation and/or a denoising operation on the tetra data IDATAa. The main processor 300c may be configured to receive the RGB data IDATAc1 and/or to generate RGB data IDATAc2 by performing post-processing including a sharpening operation on the RGB data IDATAc1.

Figure 9:
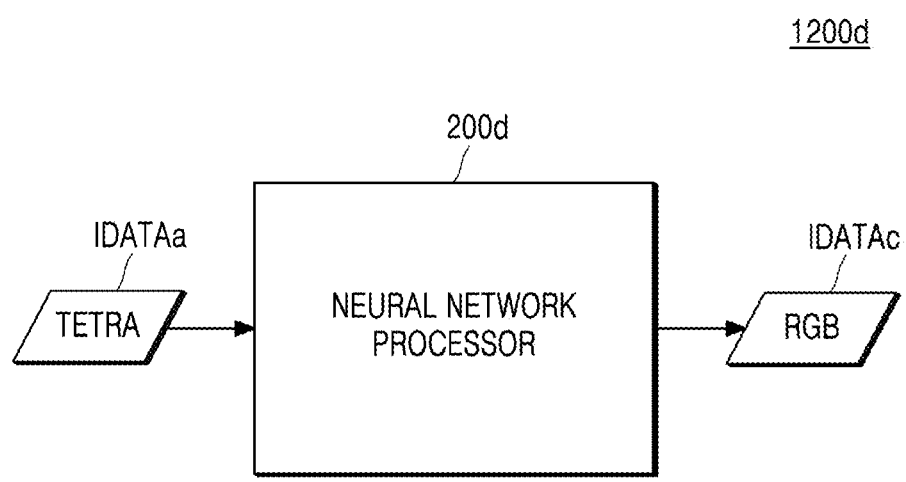

Referring to FIG. 9, the image processing system 1200d may include a neural network processor 200d. Compared with FIG. 6, the neural network processor 200d may be configured to generate RGB data IDATAc by performing pre-processing operations on the tetra data IDATAa, reconstructing the tetra data IDATAa, and/or performing post-processing operations on the reconstructed data. The neural network processor 200d of FIG. 9 may replace some or all operations of processing circuitry, such as the pre-processor 100a and/or the post-processor 300a of FIG. 6.

Figure 10:
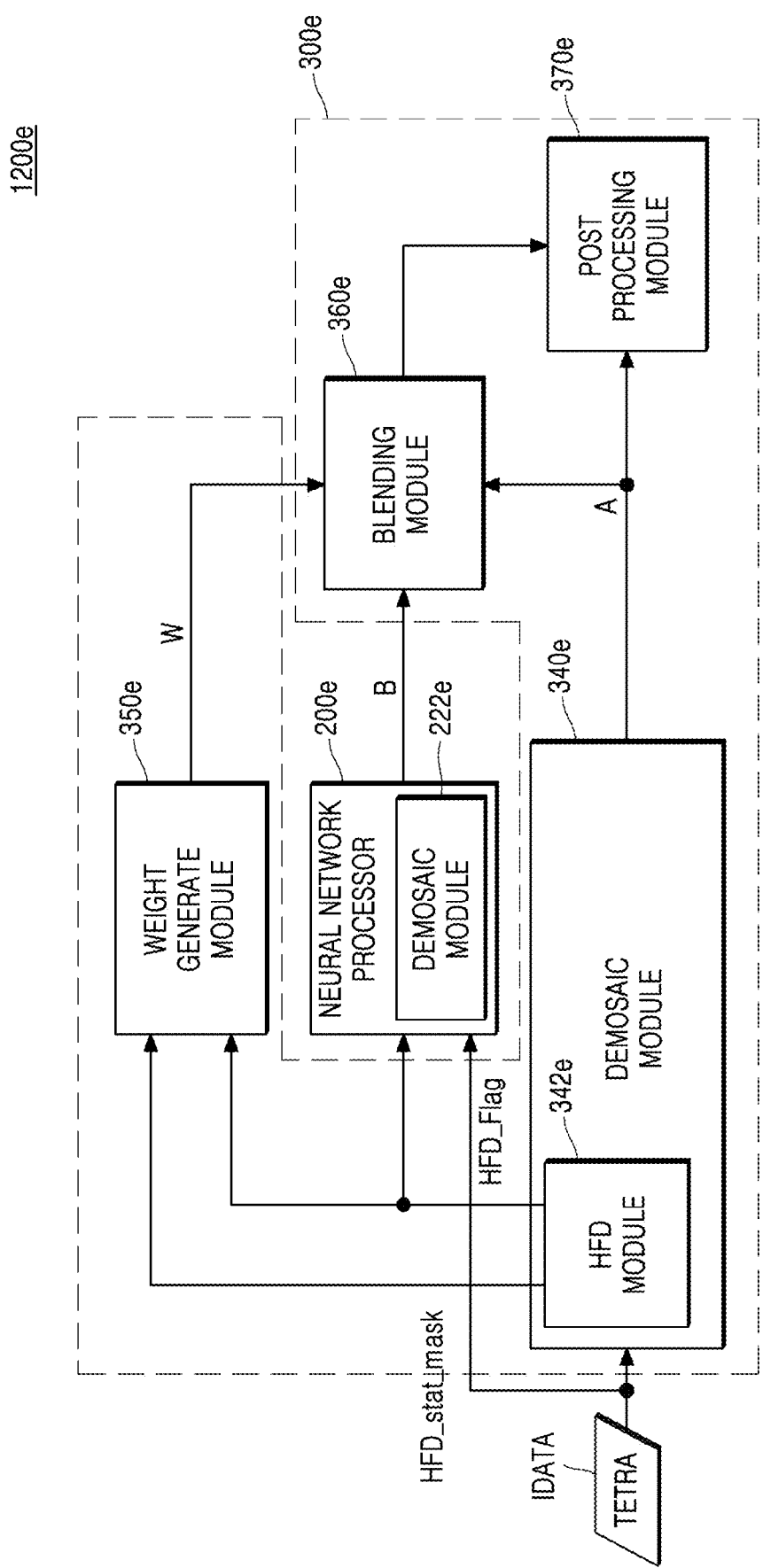
FIG. 10 is a block diagram of an image processing system according to some example embodiments of some inventive concepts.
Figure 11A:
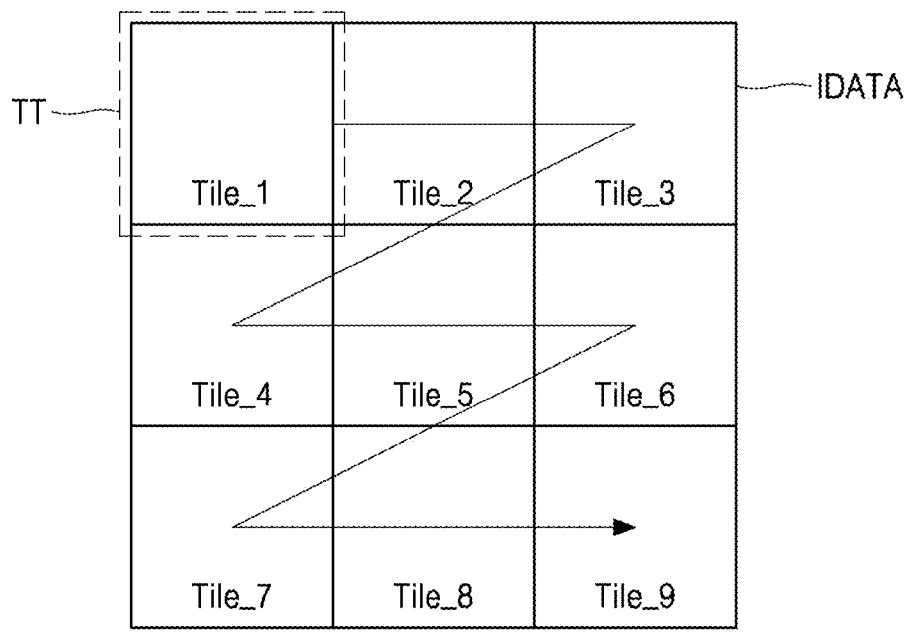
FIGS. 11A and 11B illustrate an example of tetra data.
Figure 11B:
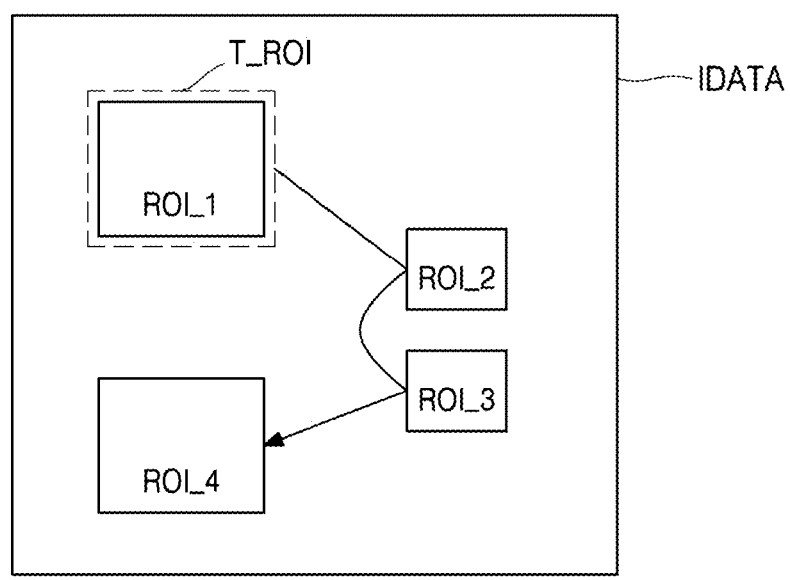

FIG. 10 is a block diagram of an image processing system 1200e according to some example embodiments of some inventive concepts, and FIGS. 11A and 11B illustrate tetra data IDATA.

Referring to FIG. 10, the image processing system 1200e may include a neural network processor 200e and processing circuitry, such as a main processor 300e. According to some example embodiments of some inventive concepts, the neural network processor 200e may include a demosaic module 222e. The main processor 300e may include a demosaic module 340e, a weight generate module 350e, a blending module 360e, and a post-processing module 370e.

The demosaic module 340e may include a high-frequency detection (HFD) module 342e. The tetra data IDATA may include a plurality of pieces of part data. The tetra data IDATA will be described below with reference to FIGS. 11A and 11B.

Further referring to FIG. 11A, the tetra data IDATA may include a plurality of pieces of tile data Tile_1 to Tile_9, and/or the plurality of pieces of tile data Tile_1 to Tile_9 may be sequentially selected as target tile data TT and/or processed by the image processing system 1200e.

Further referring to FIG. 11B, the tetra data IDATA may include a plurality of pieces of region of interest (ROI) data ROI_1 to ROI_4, and/or the plurality of pieces of ROI data may be sequentially selected as target ROI data T_ROI and/or processed by the image processing system 1200e. FIGS. 11A and 11B are merely example embodiments, and thus some example embodiments of some inventive concepts are not limited thereto. For example, in some other example embodiments, the tetra data IDATA may include a plurality of pieces of part data generated by applying various image generation techniques including a "salient object" technique and the like.

The HFD module 342e may be configured to generate a flag signal HFD_Flag by selecting any one of a plurality of processing modes as a processing mode for Nth-part data (N is an integer greater than or equal to 1) of the tetra data IDATA based on information about the Nth-part data. The HFD module 342e may be configured to select any one of the plurality of processing modes as the processing mode for the Nth-part data based on the information about the Nth-part data. For example, the flag signal HFD_Flag of '1' may indicate that a processing mode (such as the first processing mode) is selected, and the flag signal HFD_Flag of '0' may indicate that another processing mode (such as the second processing mode) is selected.

According to some example embodiment of some inventive concepts, the information about the Nth-part data may include at least one of quality information of the Nth-part data and noise information of the Nth-part data. For example, the HFD module 342e may be configured to select a processing mode (such as the first processing mode) as the processing mode for the Nth-part data based on the information about the Nth-part data based on the HFD module 342e determining that the Nth-part data corresponds to a high frequency. Particularly, the HFD module 342e may be configured to select the processing mode (such as the first processing mode) based on the information about the Nth-part data based on an artifact degree and/or a noise level of the Nth-part data being greater than a threshold.

Based on the flag signal HFD_Flag being received and/or the processing mode (such as the first processing mode) being selected, the neural network processor 200e may be configured to generate RGB data B by performing a demosaic operation on the Nth-part data. The main processor 300e may be configured to generate RGB data A by performing, through the demosaic module 340e, a demosaic operation on the Nth-part data in parallel to the neural network processor 200e.

According to some example embodiments of some inventive concepts, based on the flag signal HFD_Flag being received and the processing mode (such as the first processing mode) being selected, the weight generate module 350e may be configured to receive a mask signal HFD_stat_mask and/or to generate a weight W based on the mask signal HFD_stat_mask. According to some example embodiments of some inventive concepts, the mask signal HFD_stat_mask may be data indicating pixel-specific values generated from the Nth-part data. Particularly, the weight generate module 350e may be configured to determine an artifact degree or a noise level of the Nth-part data from the mask signal HFD_stat_mask and generate the weight W based on the determined artifact degree or noise level of the Nth-part data. According to some example embodiments of some inventive concepts, the weight generate module 350e may be configured to generate the weight W such that the portion of the RGB data B in the neural network processor 200e is proportional to an artifact degree and/or a noise level of the Nth-part data.

The blending module 360e may be configured to receive the RGB data A from the demosaic module 340e, the RGB data B from the neural network processor 200e, and/or the weight W from the weight generate module 350e, and/or to generate RGB data on which the weight W is reflected, based on mathematical formula 1.

$$\text{RGB data}=A^*(1-W)+B^*W \qquad \text{Mathematical formula 1}$$

The post-processing module 370e, as an example of processing circuitry, may be configured to perform post-processing operations on the RGB data on which the weight W is reflected.

According to some example embodiments of some inventive concepts, based on the flag signal HFD_Flag being received and/or the second processing mode being selected, the image processing device may be configured to deactivate the neural network processor 200e and/or the weight generate module 350e. Alternatively, processing circuitry (such as a main processor 300e) may be configured to provide, directly to the post-processing module 370e, the RGB data A generated by performing a demosaic operation on the Nth-part data through the demosaic module 340e.

In the same manner as described above, the image processing system 1200e may be configured to perform a processing operation on the remaining pieces of part data of the tetra data IDATA except for the Nth-part data.

Figure 12:
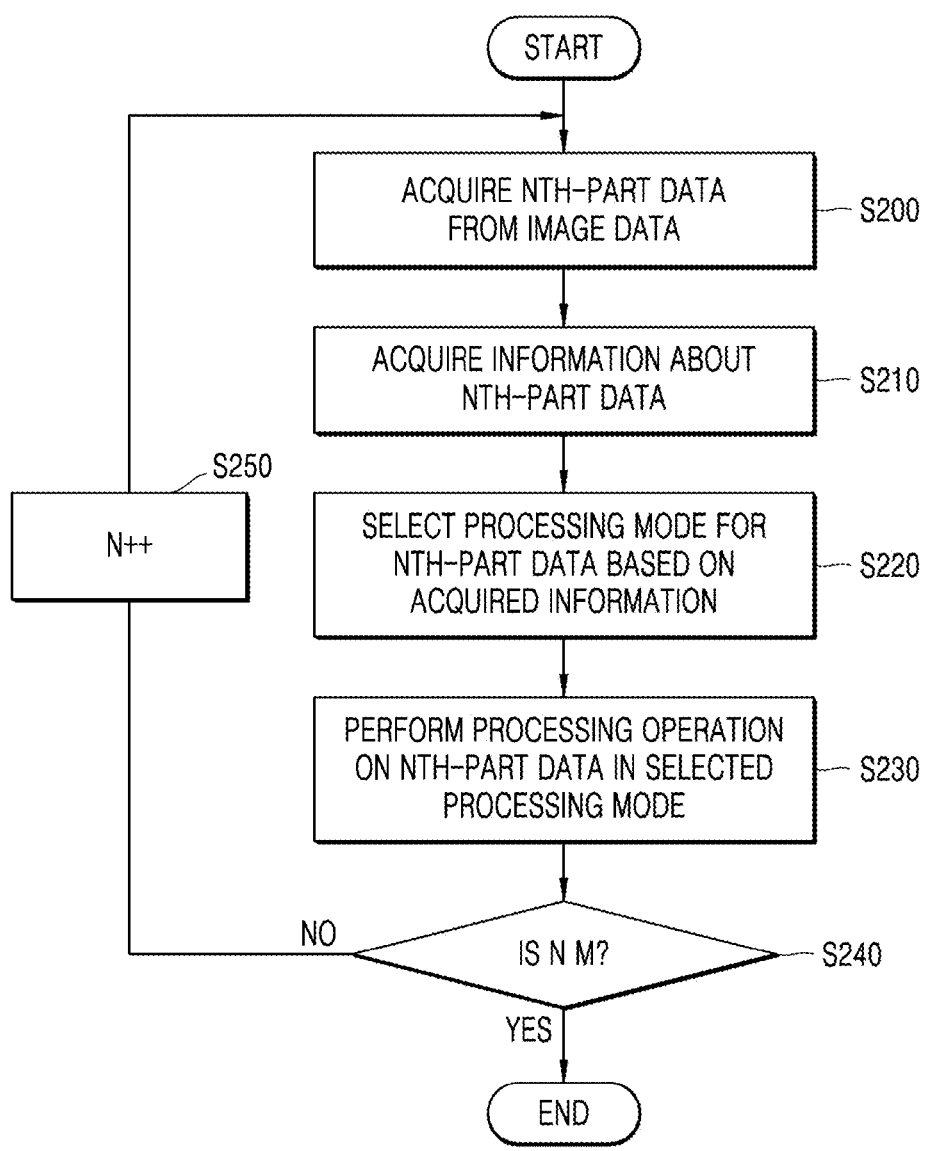
FIG. 12 is a flowchart of an operating method of an image processing device, according to some example embodiments of some inventive concepts.

FIG. 12 is a flowchart of an operating method of an image processing device, according to some example embodiments of some inventive concepts.

Referring to FIG. 12, in operation S200, the image processing device according to some example embodiments of some inventive concepts may acquire Nth-part data from image data. In operation S210, the image processing device may acquire information about the Nth-part data. In operation S220, the image processing device may select a processing mode for the Nth-part data based on the acquired information. In operation S230, the image processing device may perform a processing operation on the Nth-part data in the selected processing mode. In case 'N' is not 'M (a total number of pieces of part data included in the image data)' (operation S240, No), 'N' is counted up in operation S250 and the operating method proceeds to operation S200. Otherwise, in case 'N' is 'M' (operation S240, Yes), the processing operation on the image data may be finished. The description of operations S200 to S240 has been made in detail with reference to FIG. 10, and thus the description thereof is omitted herein.

Figure 13:
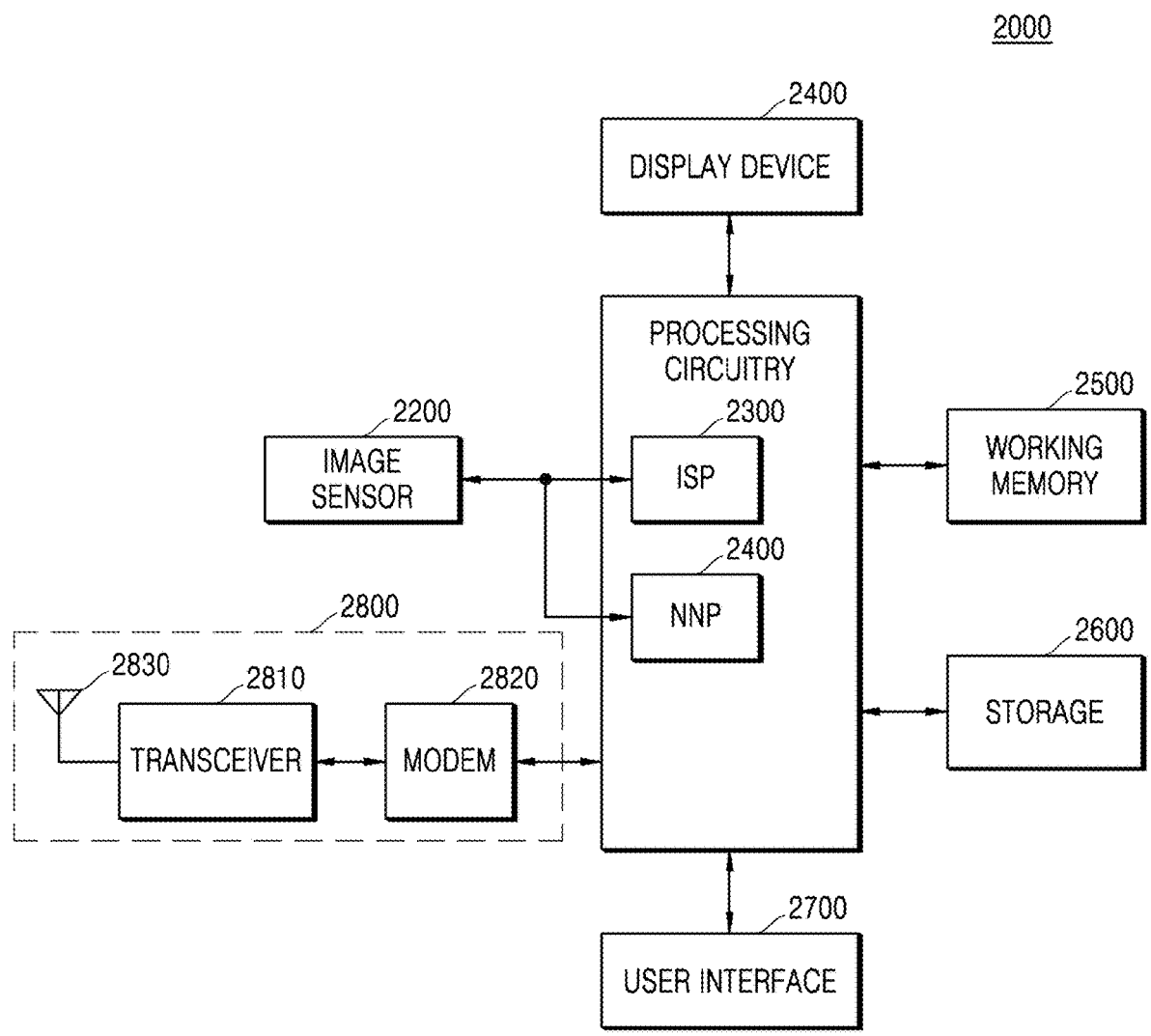
FIG. 13 is a block diagram of an image processing device according to some example embodiments of some inventive concepts.

FIG. 13 is a block diagram of an image processing device 2000 according to some example embodiments of some inventive concepts. The image processing device 2000 of FIG. 13 may be a portable terminal.

Referring to FIG. 13, the image processing device 2000 according to some example embodiments of some inventive concepts may include processing circuitry such as an application processor (AP) 2100, an image sensor 2200, a display device 2400, a working memory 2500, a storage 2600, a user interface 2700, and a wireless transceiver 2800, and the AP 2100 may include an image signal processor (ISP) 2300 and a neural network processor (NNP) 2400. The processing method according to some example embodiments of some inventive concepts, which have been described with reference to FIG. 1 and the like, may be applied to the ISP 2300 and the NNP 2400. According to some example embodiments of some inventive concepts, the ISP 2300 and the NNP 2400 may be implemented as an integrated circuit separated from the AP 2100.

The AP 2100 may be configured to control a general operation of the image processing device 2000. In some example embodiments, the AP 2100 may be provided as an SoC configured to drive an application program, an operating system, and the like.

The AP 2100 may be configured to control an operation of the ISP 2300 and/or to provide, to the display device 2400, and/or to store, in the storage 2600, converted image data generated by the ISP 2300.

The image sensor 2200 may be configured to generate image data, e.g., raw image data, based on an optical signal and/or to provide the image data to the ISP 2300.

The working memory 2500 may be implemented by a volatile memory such as, DRAM or SRAM or a nonvolatile resistive memory such as FeRAM, RRAM, or PRAM. The working memory 2500 may be configured to store programs and/or data to be processed by or executed by the AP 2100.

The storage 2600 may be implemented by a nonvolatile memory device such as a NAND flash, or a resistive memory, and for example, the storage 2600 may be provided as a memory card (a multimedia card (MMC), an embedded multimedia card (eMMC), a secure digital (SD) card, or a micro SD card) or the like. The storage 2600 may be configured to store data and/or a program for an execution algorithm for controlling an image processing operation of the ISP 2300, and based on execution of the image processing operation, the data and/or program may be loaded on the working memory 2500. According to some example embodiments of some inventive concepts, the storage 2600 may be configured to store image data generated by the ISP 2300, e.g., converted image data and/or post-processed image data.

The user interface 2700 may be implemented by various devices capable of receiving a user input, such as a keyboard, a button key panel, a touch panel, a fingerprint sensor, and a microphone. The user interface 2700 may receive a user input and provide, to the AP 2100, a signal corresponding to the received user input.

The wireless transceiver 2800 may include a transceiver 2810, a model 2820, and an antenna 2830.

While some example embodiments of some inventive concepts have been particularly shown and described with reference to some example embodiments thereof, it will be understood that various changes in form and details may be made therein without departing from the spirit and scope of the following claims.

What is claimed is:

1. An image processing device comprising:
    an image sensor configured to generate first image data by using a color filter array;
    a pre-processor configured to select any one of first and second processing modes as a processing mode for the first image data based on information about the first image data;
    a neural network processor configured to generate second image data by reconstructing the first image data when the first processing mode is selected from among the first and second processing modes; and
    a main processor configured to generate third image data by post-processing the second image data in the first processing mode,
    wherein the main processor is configured to generate the second image data by reconstructing the first image data apart from the neural network processor when the second processing mode is selected by the pre-processor, and
    wherein the information includes at least one of,
        quality information of the first image data, and
        noise information of the first image data.

2. The image processing device of claim 1, wherein,
    the color filter array has a first pattern, and
    the neural network processor is further configured to,
        generate the second image data corresponding to a second pattern by performing a remosaic operation on the first image data.

3. The image processing device of claim 2, wherein the main processor is further configured to,
    generate full-color image data by performing a demosaic operation on the second image data.

4. The image processing device of claim 3, wherein,
    the first image data corresponds to tetra data,
    the second image data corresponds to Bayer data, and
    the full-color image data corresponds to red, green, and blue (RGB) data.

5. The image processing device of claim 2, wherein the neural network processor is further configured to perform at least one of,
    a cross-talk correction pre-processing operation on the first image data, and
    a despeckle pre-processing operation on the first image data.

6. The image processing device of claim 1, wherein the neural network processor is further configured to,
    generate full-color image data by performing a demosaic operation on the first image data.

7. The image processing device of claim 6, wherein
    the first image data corresponds to tetra data, and
    the full-color image data corresponds to red, green, and blue (RGB) data.

8. The image processing device of claim 7, wherein the neural network processor is further configured to,
    perform a denoising operation on the full-color image data.

9. The image processing device of claim 1, wherein, based on the selection of the second processing mode,
    the neural network processor is deactivated.

10. An operating method of an image processing device comprising a color filter array, a pre-processor, a neural network processor and a main processor, the operating method comprising:
    generating, by the color filter array, first image data;
    selecting, by the pre-processor, any one of first and second processing modes as a processing modes for the first image data based on information about the first image data;
    generating, by the neural network processor, second image data by reconstructing the first image data when the first processing mode is selected from among the processing modes; and
    generating, by the neural network processor, third image data by post-processing the second image data in the first processing mode,
    wherein when the second processing mode is selected by the pre-processor, the generating the second image data is performed by the main processor and apart from the neural network processor, and
    wherein the information includes at least one of,
        quality information of the first image data, and
        noise information of the first image data.

11. The operating method of claim 10, wherein the generating of the second image data further comprises:
    generating the second image data corresponding to a Bayer pattern by performing a remosaic operation on the first image data.

12. The image processing device of claim 1, wherein the pre-processor is configured to select the first processing mode when an artifact degree of the first image data in the quality information or a noise level of the first image data in the noise information is greater than a threshold.

13. The operating method of claim 10, wherein the selecting any one of the first and second processing modes as the processing mode further comprises:
   selecting the first processing mode when artifact degree of the first image data in the quality information or a noise level of the first image data in the noise information is greater than a threshold.

* * * * *